(12) United States Patent
Virolainen et al.

(10) Patent No.: US 7,190,599 B2
(45) Date of Patent: Mar. 13, 2007

(54) METHOD FOR DETERMINING OUTPUT CURRENTS OF FREQUENCY CONVERTER

(75) Inventors: Panu Virolainen, Espoo (FI); Samuli Heikkilä, Helsinki (FI); Marko Hinkkanen, Kirkkonummi (FI)

(73) Assignee: ABB Oy, Helsinki (FI)

(*) Notice: Subject to any disclaimer, the term of this patent is extended or adjusted under 35 U.S.C. 154(b) by 307 days.

(21) Appl. No.: 11/010,568

(22) Filed: Dec. 14, 2004

(65) Prior Publication Data

US 2005/0152165 A1 Jul. 14, 2005

(30) Foreign Application Priority Data

Dec. 19, 2003 (FI) .................................. 20031869

(51) Int. Cl.
*H02M 7/797* (2006.01)
(52) U.S. Cl. .......................................... 363/98; 363/41
(58) Field of Classification Search ................. 363/41, 363/95, 98
See application file for complete search history.

(56) References Cited

U.S. PATENT DOCUMENTS

| | | | |
|---|---|---|---|
| 4,763,060 A * | 8/1988 | Takahashi | 318/811 |
| 5,309,349 A | 5/1994 | Kwan | 363/98 |
| 5,969,958 A | 10/1999 | Nielsen et al. | 363/41 |
| 6,094,364 A * | 7/2000 | Heikkila | 363/41 |
| 6,643,149 B2 | 11/2003 | Arnet et al. | 363/41 |
| 6,864,660 B2 * | 3/2005 | Veltman | 318/801 |
| 6,984,953 B2 * | 1/2006 | Quirion et al. | 318/599 |
| 7,031,172 B2 * | 4/2006 | Tanaka et al. | 363/56.03 |
| 7,061,134 B2 * | 6/2006 | Hiti et al. | 290/44 |
| 7,102,327 B2 * | 9/2006 | Ho | 318/812 |

FOREIGN PATENT DOCUMENTS

| | | |
|---|---|---|
| EP | 1 347 566 | 9/2003 |
| WO | 03/084044 | 10/2003 |
| WO | 03/105329 | 12/2003 |

OTHER PUBLICATIONS

Haras A ED—EP Association: "Space Vector Modulation in Orthogonal and Natural Frames Including the Overmodulation Range"; EPE '97, 7th European Conference on Power Electronics and Applications. Trondheim, Sep. 8-10, 1997; EPE; European Conference on Power Electronics and Applications, Brussels, EPE Association, B; vol. 2, Conf. 7; Sep. 8, 1997; pp. 2.337-2.342; XP000792303; ISBN: 90-75815-02-6.

* cited by examiner

*Primary Examiner*—Jeffrey Sterrett
(74) *Attorney, Agent, or Firm*—Dykema Gossett PLLC

(57) ABSTRACT

A method for determining output currents of a three-phase frequency converter comprising a voltage intermediate circuit and three power switch pairs constituting an output of the frequency converter, wherein the power switches constituting a pair are coupled in series between a positive and a negative busbar of the voltage intermediate circuit so that a midpoint of each switch pair constitutes a phase output of the frequency converter. The method comprises, during use of the frequency converter, steps of forming a voltage reference vector for the output power switches such that only two switch pairs are modulated during one modulation sequence, controlling said two switch pairs to implement a voltage reference vector during the modulation sequence by using one zero vector, measuring current of the voltage intermediate circuit of the frequency converter at a predetermined moment in the modulation sequence, and changing actively, during use of the frequency converter, the zero vectors to be used in the modulation sequences.

7 Claims, 3 Drawing Sheets

METHOD FOR DETERMINING OUTPUT CURRENTS OF FREQUENCY CONVERTER

BACKGROUND OF THE INVENTION

The present invention relates to a method according to the preamble of claim 1.

Vector control containing no motion sensor is a manner of controlling electric motor drives fed by a frequency converter which is about to become a standard solution. It provides a vast majority of applications with sufficient performance without the drawbacks caused by velocity feedback, including e.g. cost inflicted by the encoder used for feedback, mounting and cabling costs as well as service and maintenance.

Typically, vector control without motion sensors is based on measuring two or three output phase currents of a frequency converter. The measurement is implemented e.g. by current transducers based on the Hall effect, in which case the costs, need for space and the number of components of the method are extensive in connection with low-power frequency converters in particular. Making current measurement a simpler process enables savings to be achieved in terms of costs, need for space as well as the number of components; however, maintaining the performance level of the control method becomes a challenge.

In vector control, a reference value is calculated for a voltage vector so as to achieve a certain electromagnetic state for a motor to be controlled. A voltage reference determines the direction and magnitude of the voltage vector necessary during a modulation sequence. Based on this information, a modulator calculates switch references, i.e. the times for the states of each power switch used during a modulation sequence. An inverter part of a three-phase frequency converter comprises three pairs of switches, each switch pair being coupled in series between a positive and a negative busbar of a voltage intermediate circuit of the frequency converter. A point between the switch pairs constitutes a phase output of an inverter such that each phase may provide the output either with positive or negative voltage of the intermediate circuit.

In the case of vector control, the output voltage provided by switches is usually regarded as a complex-plane voltage vector. Switch pairs may be used for forming six voltage vectors which deviate from zero and which reside in a complex plane at a mutual 60 degree phase shift such that by coupling the output of phase A to be positive and the outputs of other phases B, C to be negative, a voltage vector +-- is obtained which resides in a direction parallel to a positive real axis of the complex plane, as shown in FIG. 1. Other voltage vectors are designated in a similar manner, e.g. a voltage vector -+- is a vector obtained when the output of phase B is coupled to a positive busbar of the voltage intermediate circuit while the output of other phases A, C is coupled to a negative busbar thereof. In connection with a three-phase frequency converter it is possible to produce eight voltage vectors, two of which being zero vectors +++ or --- that are formed by coupling the outputs of each of them either to a positive busbar (+++) or to a negative busbar (---). In vector control, a voltage reference is implemented by calculating the time each switch combination is to be used in order to achieve the voltage reference during a modulation sequence.

In a conventional three-phase modulation shown in FIG. 2, switchings are carried out in every three phases during each modulation sequence. A modulation sequence starts from one zero vector and ends at the same zero vector, passing via another zero vector in a middle of the modulation sequence.

The simplest presently conceivable manner of measuring current so as to ensure the operation of vector control is to measure the current passing through the positive or the negative busbar of an intermediate circuit. This DC current measurement can be implemented e.g. by means of a shunt resistance situated in a busbar of the intermediate circuit, whose voltage drop is proportional to the current passing through the busbar. All current to an inverter part of a frequency converter passes via the intermediate circuit, which means that by measuring the current of the intermediate circuit, the current of one phase that is flowing to the load at a given moment is achieved. In addition to simplicity and the resulting inexpensiveness, need for less space and the small number of components, DC current measurement enables short-circuit protection to be implemented without any additional measurement electronics.

As far as DC current measurement is concerned, the conventional three-phase modulation method disclosed above is problematic, since both at a beginning and at an end of a modulation sequence as well as in a middle thereof, a zero vector is used during which the DC current is zero in size and contains no phase current information. In order to obtain phase current information, DC current sampling should take place at a moment in dependence on a modulation index, and thus changing from a modulation sequence to another, so that a voltage vector deviating from zero would then be in use and phase current information would thus exist, which, as far as the implementation in practice is concerned, would be problematic. Current measurement may also be implemented such that DC current is sampled at a high frequency, relying on getting a necessary number of phase currents measured in order to maintain reliability. However, such a method requires numerous samples to be taken and a considerable processing capacity in order to allocate these samples into currents of different phases on the basis of switch positions, for example.

BRIEF DESCRIPTION OF THE INVENTION

An object of the present invention is to provide a method which solves the above-disclosed problem and enables current information on a frequency converter to be determined in a simpler manner. This object is achieved by a method according to the characterizing part of claim 1. Preferred embodiments of the invention are disclosed in the dependent claims.

The idea underlying the invention is that output switches of an inverter part of a three-phase frequency converter are modulated in a two-phase manner, which enables a voltage vector deviating from a zero vector to be produced at a predetermined location in a modulation sequence. Furthermore, changing the zero vector to be used in the modulation sequence enables DC current information on two phases to be measured in a reliable manner. This enables a reliable manner of measuring two phase currents as often as necessary also at very low output frequencies of the frequency converter. Two-phase modulation means that during one modulation sequence, the state of the switches of only two output phases is changed in order to achieve a desired voltage vector while the switch position of the third phase remains unchanged during the entire modulation sequence.

An advantage of the method of the invention is that when two-phase modulation is utilized, a voltage vector deviating from a zero vector is in use either at a beginning or at an end of a modulation sequence or in a middle thereof; this makes it possible to measure one phase current. Two-phase modulation thus enables one phase current to be measured during each modulation sequence at a constant-remaining moment in dependence on the modulation sequence. Furthermore, a change of the zero vector according to the method of the invention enables the phase currents of two phases to be determined.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 4:
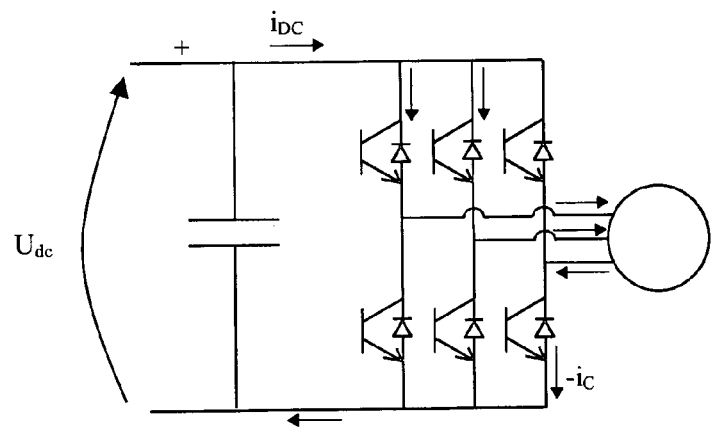
FIG. 4 shows a schematic description of an inverter part of a frequency converter.

FIG. 4 schematically shows an inverter part of a three-phase frequency converter. The inverter part comprises a voltage intermediate circuit $U_{dc}$ and power switch pairs constituting an output of the frequency converter. These switch pairs are coupled in series between a positive + and a negative − busbar of the voltage intermediate circuit so that a midpoint of each switch pair constitutes an output of phase A, B, C of the frequency converter.

Figure 1:
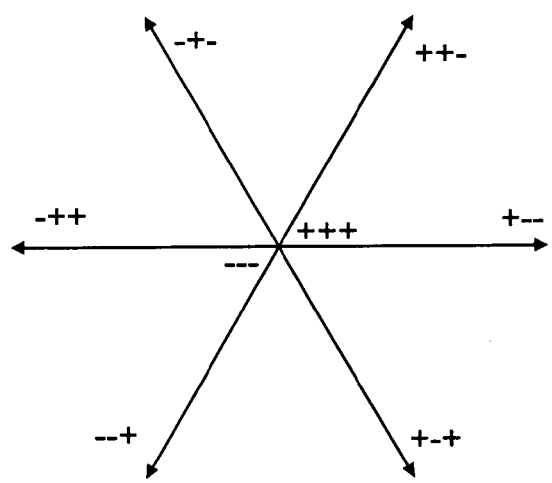
FIG. 1 shows a voltage vector star.

According to the method of the invention, a voltage vector reference is formed for the output power switches such that only two switch pairs are modulated during one modulation sequence. A modulation sequence refers to a time sequence which constitutes an average inverter switching frequency. In other words, during a modulation sequence an output is provided with an average voltage vector according to a reference received from a higher level of the control circuit. The voltage vector is formed in a manner known per se by using the vectors shown in FIG. 1.

Figure 3:
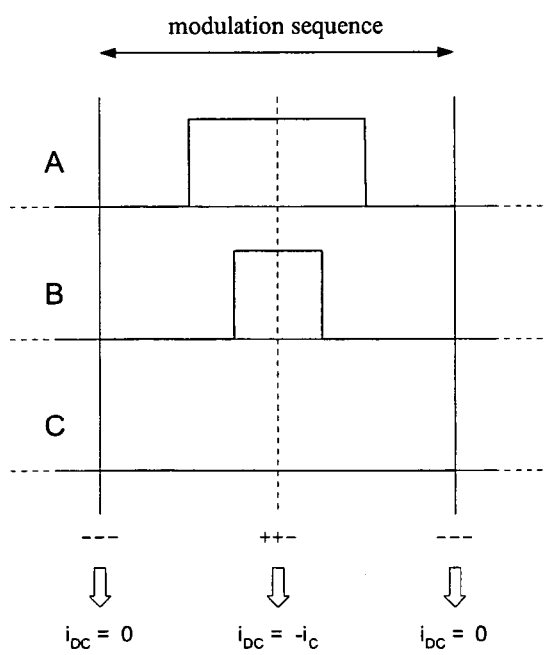
FIG. 3 shows a two-phase modulation pattern.

Further, according to the invention, said two switch pairs are controlled to implement a voltage reference vector during the modulation sequence by using one zero vector. FIG. 3 shows an example of one modulation sequence of two-phase modulation, wherein switchings are thus carried out in two phases only. In the exemplary case of the figure, the state of the switch pairs of phases A and B is changed from negative to positive and further to negative. At a beginning of the modulation sequence, the output switches implement a voltage vector −−−, i.e. a zero vector, during which no current passes via the intermediate circuit of the frequency converter through the switches to the load. After the coupling of phase A, the voltage vector of the output changes into a vector +−− and further, after the coupling of phase B, into a vector ++−. This switch position is also used in the middle of the modulation sequence. After this moment, the vector pattern is repeated, symmetrically with respect to the midpoint of the modulation sequence till the end of the modulation sequence. As can be seen in FIG. 3, the state of phase C does not change at all during the entire modulation sequence.

Figure 2:
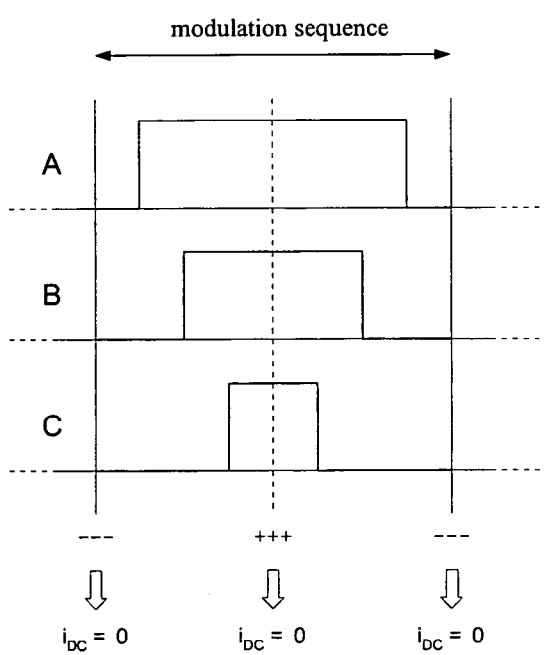
FIG. 2 shows a conventional three-phase modulation pattern.

FIG. 2 shows a conventional three-phase modulation pattern. An average voltage vector produced during a modulation sequence by this modulation pattern corresponds with the voltage vector produced by the two-phase modulation of FIG. 3. It can be seen in the pattern of FIG. 2 that a zero vector +++ is provided as a voltage vector in the middle of the modulation sequence while a voltage vector ++− is provided in the middle of the modulation pattern of FIG. 3 producing a corresponding average voltage vector, in which case current $i_{DC} = -i_C$, i.e. the current of phase C as negative, can be measured as the DC current of the voltage intermediate circuit.

Further, according to the invention, the current of the voltage intermediate circuit of the frequency converter is measured at a predetermined moment in the modulation sequence. FIG. 4 schematically shows a structure of an inverter part of a frequency converter, disclosing how currents pass in the middle of the modulation sequence of FIG. 3, i.e. during the voltage vector ++−. The arrows in FIG. 4 show that the current in the intermediate circuit passes via phases A and B to the load, and further through the load via a lower branch of phase C back to the intermediate circuit. Since use of two-phase modulation enables the exact moment at which the zero vector is not in use to be determined, the current of one phase of the load can be measured accurately. This particular moment to be determined is completely independent of both the magnitude and direction of the average voltage vector to be produced.

Current is measured from the voltage intermediate circuit at a predetermined moment. Preferably, this predetermined moment is in dependence on the modulation sequence and resides in a middle thereof. Hence, in the case of FIG. 3, for instance, phase current can be measured. Naturally, the modulation pattern may be changed so as to enable the necessary current information to be measured at some other moment in dependence on a modulation sequence. Such a moment is e.g. a beginning or an end of a modulation sequence, i.e. the moment when one modulation sequence changes into a next modulation sequence.

Further, according to the invention, the zero vectors to be used in modulation sequences during use of a frequency converter are changed actively. Since current information on all output phases of the frequency converter is to be obtained frequently enough as far as control is concerned, the zero vector to be used should, according to the invention, be changed on a regular basis between the modulation sequences. Changing the zero vector does not affect the magnitude of an average voltage vector obtained during a modulation sequence but all voltage vectors can be implemented by two-phase modulation, using either one of the zero vectors +++ or −−−. Due to the changing of the zero vector, the modulation pattern alters, and at the same time, the voltage vector being used at a predetermined current measurement moment changes. At low output voltage frequencies in particular, it is important to change the zero vector in order to obtain the necessary current information by using DC current measurement. Changing the zero vector is known per se in connection with inverters. This technology is used e.g. for evening out component losses at low rotational speeds and for maintaining the charge of bootstrap capacitors of gate drivers.

Figures 5, 6:
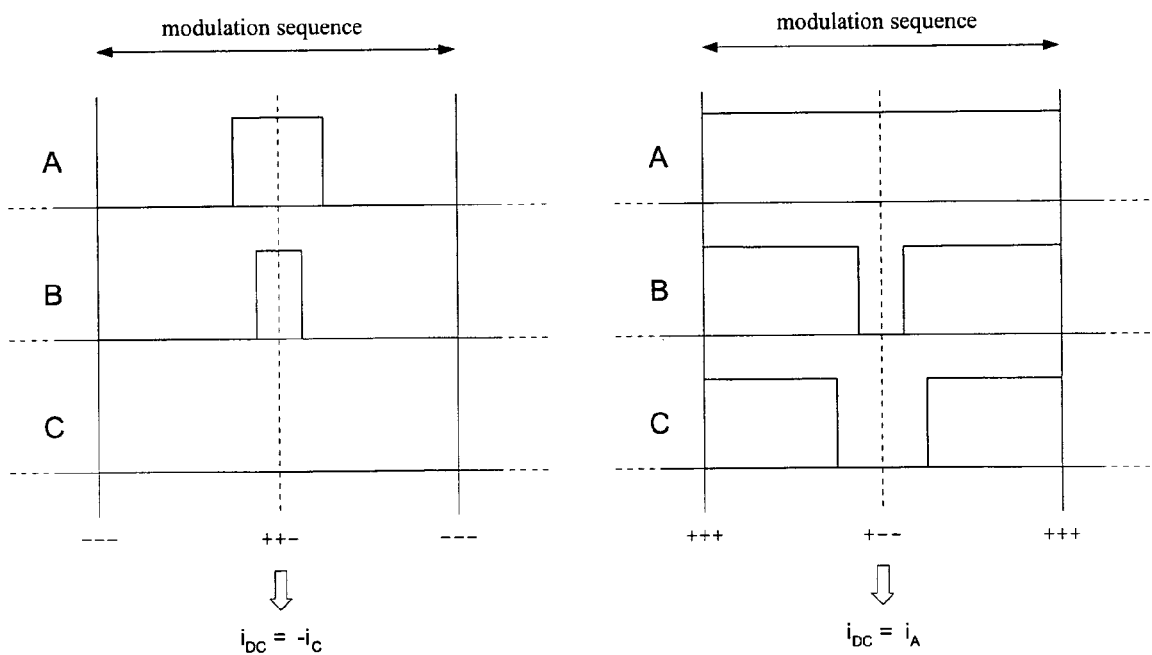
FIG. 5 shows a two-phase modulation pattern.
FIG. 6 shows a two-phase modulation pattern implementing the same average voltage vector as the modulation pattern of FIG. 5, utilizing an opposite zero voltage vector.

FIGS. 5 and 6 show two-phase modulation patterns implementing the same average voltage vector during a modulation sequence. In the modulation pattern of FIG. 5, a zero vector --- is used at a beginning and at an end of the modulation sequence. In a middle of the modulation sequence, a voltage vector ++- is used, during which current $-i_C$ can be measured from an intermediate circuit. In FIG. 6, in turn, a modulation pattern is used wherein the zero vector is a vector +++. A voltage vector +-- is then used in a middle of a modulation sequence. The current of an intermediate circuit measured during the voltage vector +-- corresponds with current $i_A$, i.e. the output current of phase A. Thus, in the manner shown in FIGS. 5 and 6, the method of the invention enables the current of two different phases to be measured by changing actively the zero vector to be used. Current samples of all three phases can be measured as a voltage vector reference changes between sectors. It is not, however, necessary to obtain the current information on all three phases in order to ensure the operation of a controlled drive.

Figure 7:
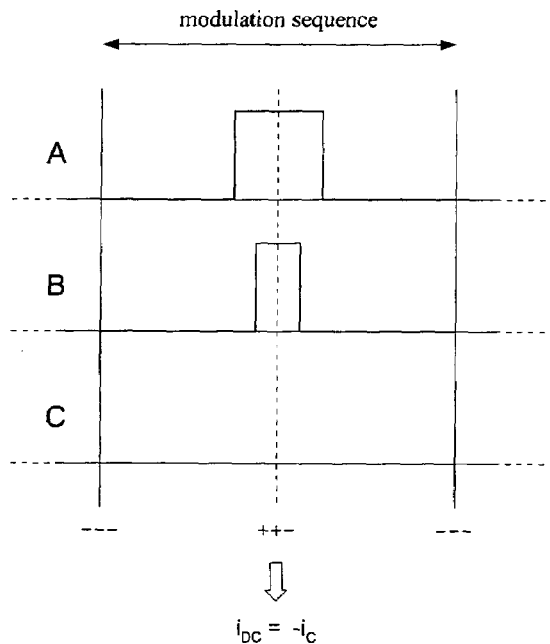
FIG. 7 shows a two-phase modulation pattern.
Figure 8:
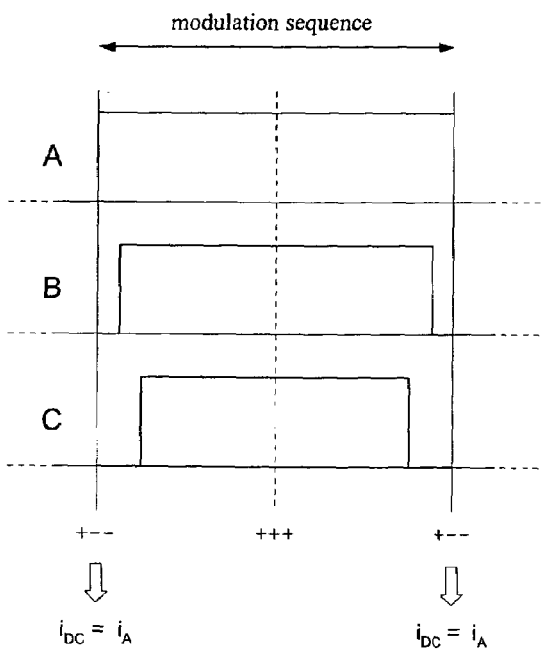
FIG. 8 shows a two-phase modulation pattern implementing the same average voltage vector as the modulation pattern of FIG. 7, utilizing an opposite zero voltage vector.

FIGS. 5 and 6 show successive modulation sequences implementing the same average voltage during the modulation sequences by using different zero vectors. It is to be noted that when the process moves from FIG. 5 to FIG. 6, the state of all switches is to be changed simultaneously. Naturally, this is not desirable since simultaneous turns of the switches may cause problems. FIGS. 7 and 8 disclose a solution wherein a zero vector is changed by controlling one switch pair only.

FIG. 7 shows a modulation pattern corresponding with that of FIG. 5 wherefrom, according to the invention, the process is to move to a modulation pattern employing an opposite zero voltage vector. A modulation pattern forming such a zero vector is shown in FIG. 8 wherein a switch of phase A is in a high, i.e. +, position during the entire modulation sequence. A switch of phase B is controlled first and last, prior to a middle point of the modulation sequence, a switch of phase C. A voltage vector formed by the modulation pattern of FIG. 8 during the modulation sequence corresponds with the voltage vector formed by FIG. 7, and the zero vector used is a different one from that used in the modulation of FIG. 7. It is to be noted that when forming a modulation pattern in the manner shown in FIG. 8, the zero vector resides in a middle of the modulation sequence. Consequently, a voltage vector deviating from zero resides at a beginning and at an end of the modulation sequence.

Because the location of the moment at which current information can be measured changes when the zero vector is changed between modulation sequences as shown in FIGS. 7 and 8, it is preferable to measure DC current twice during one modulation sequence, i.e. at a beginning/at an end and in a middle of a modulation sequence. In other words, a double modulation sequence frequency is obtained to be the current sampling frequency. Real relevant current samples and non-relevant samples are then obtained. From among these current samples, however, it is simple to pick samples that reflect the real magnitude of phase current. In the modulation pattern according to FIG. 8, the zero vector +++ resides in the middle of the modulation sequence. Correspondingly, the zero vector --- of FIG. 7 resides at the beginning and at the end of the modulation sequence. Based on this information, it is simple to choose a sample containing correct measurement information by software. It is to be noted, however, that FIGS. 7 and 8 only show one embodiment. It is also possible to place the zero vectors the other way around in the modulation sequence, i.e. the vector +++ at the beginning/end of the modulation sequence and the vector --- in the middle thereof.

A second preferred alternative in order to obtain relevant current information is to change the sampling moment in dependence on the zero vector. In such a case, the zero vector to be used determines the moments at which relevant current information is available, and measurements can be carried out at such moments only.

Furthermore, in connection with the method of the invention wherein a zero vector is changed, it is to be noted that relevant measurement information is not necessarily obtained when the process moves from one modulation sequence to another if the zero vector to be used is changed in conjunction with the same sequence change. According to a preferred embodiment of the invention, the zero vector to be used is changed at intervals of two modulation sequences or less often, i.e. the same zero voltage vector is used in two or more successive modulation sequences. This should also be taken into account when processing the results of DC current measurements, so that when current measurement occurs in connection with a zero vector change and a modulation sequence change, it is not advisable to use the result of the current measurement. The zero voltage vector may also be changed such that the change is carried out after the changing number of modulation sequences. A criterion for changing the zero vector may then be e.g. the frequency of output voltage. When the frequency is low, when the process remains in the same voltage sector for a long time, a change should take place frequently enough in order to obtain measurement information on two phase currents. When, again, the frequency is higher and the voltage sector changes more frequently, the zero voltage vector can be changed less often or changing the zero vector actively may be even stopped. When operating in accordance with the invention, the zero vector may be changed in various different ways. The point is that the zero vector is changed as often as necessary at low frequencies in order to obtain current information on at least two phases, and that the same zero vector is used successively during at least two modulation sequences in order to ensure the correctness of the current information.

Figure 9:
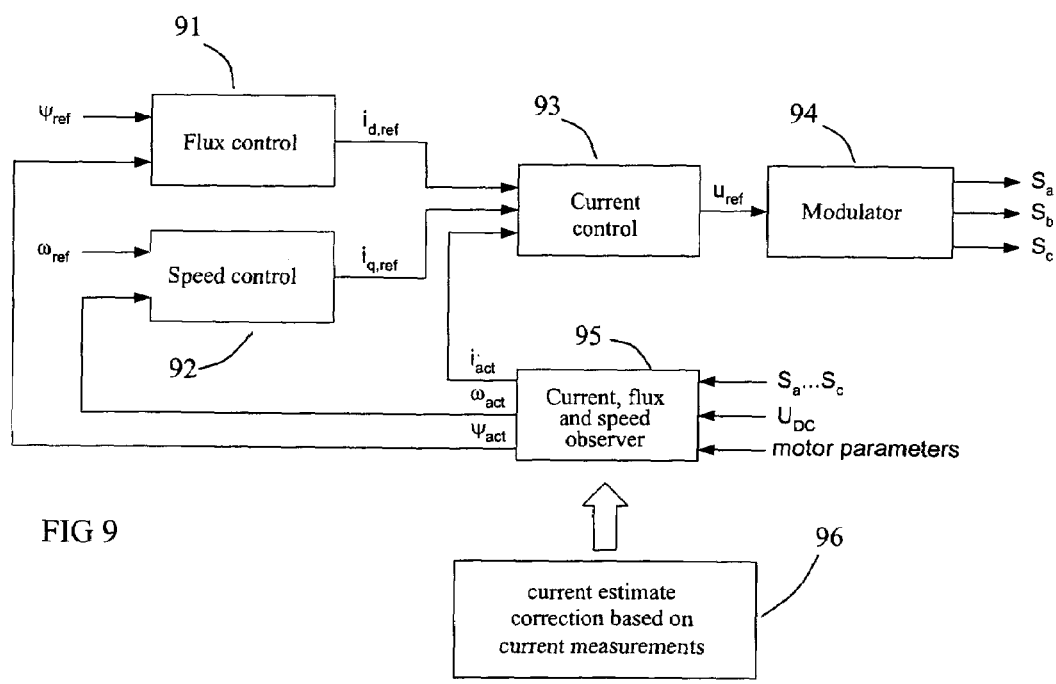
FIG. 9 shows an example of a control system wherein the method according to the invention may be utilized.

FIG. 9 shows a control method utilizing estimated motor currents, wherein current estimates are formed e.g. by means of inverter switch positions Sa, Sb, Sc, measured intermediate circuit voltage $U_{dc}$ and motor parameters in a manner known per se. Since motor parameters and measured/known variables contain error, current estimates to be obtained have to be corrected by means of the measured current information. This measured current information is formed by the method of the invention. This method, being less sensitive to various interference related to measurements than a control method utilizing measurements directly, is thus advantageous to be used e.g. in an environment with interference or in connection with utilizing poor-performance current measurement equipment.

The example of FIG. 9 is a control method known per se, wherein a flux controller 91 receives at its input a flux reference value $\Psi_{ref}$ and a flux actual value $\Psi_{act}$ determined by an observer 95. A reference value for the current component $i_{d,ref}$ affecting the flux, i.e. provided in direction d, is obtained from an output of the flux controller. In a corresponding manner, a velocity control 92 produces a reference for a component $i_{q,ref}$ transverse to the current on the basis of a reference value $\omega_{ref}$ of angular velocity and actual value $\omega_{act}$ determined by the observer.

These current reference values $i_{d,ref}$, $i_{q,ref}$ are fed to a current controller 93 together with a current actual value $i_{act}$ determined by the observer 95. For its output, the current controller 93 produces a voltage reference $u_{ref}$ which operates as a reference for a modulator 94 in order to form switch references $S_a$, $S_b$, $S_c$. The modulator 94 of FIG. 9 implements the method of the invention, so samples are obtained from phase currents on the basis of which the observer corrects the magnitude of the current actual value $i_{act}$. The magnitude of the current actual value $i_{act}$ calculated by means of motor parameters of the observer, switch references and intermediate circuit voltage can be corrected on the basis of samples which, in the embodiment of FIG. 9, are obtained from block 96, e.g. either directly by replacing the magnitude of current calculated by the observer with the magnitude of a sample or by weighting the samples by a certain weight factor and thus correcting the value determined by the observer.

It is essential for the operation of a current observer that a current sample is obtained according to the method either at a beginning/at an end or in a middle of a modulation sequence. If the current sample were taken at a random moment in a modulation sequence, as tends to be the case in connection with the conventional methods disclosed above, the sample would be useless for enabling estimated current to be corrected directly since the estimated current normally represents the actual current either at a beginning, in a middle or at an end of a modulation sequence.

The disclosed current measurement method is particularly well suited for use together with the exemplary control principle disclosed above since measurements obtained relatively seldom and mutually non-simultaneously for different phases suffice to satisfy the needs of a control which utilizes estimates.

It is obvious to one skilled in the art that the basic idea of the invention can be implemented in many different ways. The invention and its embodiments are thus not restricted to the examples described above but may vary within the scope of the claims.

The invention claimed is:

1. A method for determining output currents of a three-phase frequency converter comprising a voltage intermediate circuit and three power switch pairs constituting an output of the frequency converter, wherein the power switches constituting a pair are coupled in series between a positive and a negative busbar of the voltage intermediate circuit so that a midpoint of each switch pair constitutes a phase output of the frequency converter, the method comprising, during use of the frequency converter, comprising the steps of:
   forming a voltage reference vector for the output power switches such that only two switch pairs are modulated during one modulation sequence,
   controlling said two switch pairs to implement a voltage reference vector during the modulation sequence by using one zero vector,
   measuring current of the voltage intermediate circuit of the frequency converter at a predetermined moment in the modulation sequence, and
   changing actively, during use of the frequency converter, the zero vector to be used in the modulation sequences.

2. A method as claimed in claim 1, the method further comprising the step of wherein changing the zero vector actively during use of the frequency converter comprising the step of changing the zero vector to be used at intervals of two or more modulation sequences.

3. A method as claimed in claim 1, wherein the predetermined moment in the modulation sequence resides in a middle of the modulation sequence.

4. A method as claimed in claim 1, wherein the predetermined moment in the modulation sequence resides at a beginning or end of the modulation sequence.

5. A method as claimed in claim 1, the method comprising the step of measuring current of the voltage intermediate circuit at two predetermined moments in the modulation sequence.

6. A method as claimed in claim 1, the method comprising the step of measuring current of the voltage intermediate circuit at a moment in dependence on the zero vector to be used.

7. A method as claimed in claim 1, the method further comprising a step of:
   determining a voltage vector used at a measurement moment, whereby measured current of the voltage intermediate circuit is allocated to a given phase current on the basis of the determined voltage vector.

* * * * *